US012069442B2

(12) United States Patent
Kelly et al.

(10) Patent No.: US 12,069,442 B2
(45) Date of Patent: Aug. 20, 2024

(54) EARPIECES

(71) Applicant: Bose Corporation, Framingham, MA (US)

(72) Inventors: Liam Robert Kelly, Dorchester, MA (US); Michael J. Daley, Shrewsbury, MA (US); Ninad Ravindra Gadre, Boston, MA (US)

(73) Assignee: Bose Corporation, Framingham, MA (US)

( * ) Notice: Subject to any disclaimer, the term of this patent is extended or adjusted under 35 U.S.C. 154(b) by 13 days.

(21) Appl. No.: 17/670,046

(22) Filed: Feb. 11, 2022

(65) Prior Publication Data

US 2022/0167100 A1 May 26, 2022

Related U.S. Application Data

(63) Continuation-in-part of application No. 16/990,358, filed on Aug. 11, 2020.

(51) Int. Cl.
*H04R 25/00* (2006.01)
*H04R 1/28* (2006.01)

(52) U.S. Cl.
CPC ......... *H04R 25/604* (2013.01); *H04R 1/2849* (2013.01); *H04R 25/652* (2013.01); *H04R 25/48* (2013.01); *H04R 2225/021* (2013.01)

(58) Field of Classification Search
None
See application file for complete search history.

(56) References Cited

U.S. PATENT DOCUMENTS

| | | | |
|---|---|---|---|
| 7,079,662 | B2 | 7/2006 | Niederdrank |
| 10,425,714 | B2 | 9/2019 | Lawand et al. |
| 10,542,341 | B2 | 1/2020 | Higgins |
| 11,234,085 | B2 | 1/2022 | Dominijanni et al. |

(Continued)

FOREIGN PATENT DOCUMENTS

| | | | |
|---|---|---|---|
| CN | 114666696 A * | 6/2022 | |
| EP | 2765788 A2 | 8/2014 | |

(Continued)

OTHER PUBLICATIONS

International Search Report and Written Opinion from PCT Application No. PCT/US2021/044992 dated Jan. 24, 2022.

(Continued)

*Primary Examiner* — Walter F Briney, III

(57) ABSTRACT

An earpiece includes an electro-acoustic transducer and a housing that supports the electro-acoustic transducer such that the housing and the electro-acoustic transducer together define a first acoustic volume and a second acoustic volume. The electro-acoustic transducer is arranged such that a first radiating surface of the transducer radiates acoustic energy into the first acoustic volume and a second radiating surface of the transducer radiates acoustic energy into the second acoustic volume. A mesh is disposed along an outlet of the housing and is arranged to inhibit debris from entering the front acoustic volume. A first microphone is supported in the housing. The first microphone includes a microphone port for sensing pressure. A chimney surrounds the microphone port and mechanically couples the first microphone to the mesh.

24 Claims, 7 Drawing Sheets

(56) References Cited

U.S. PATENT DOCUMENTS

| | | | |
|---|---|---|---|
| 2004/0218772 | A1 | 11/2004 | Ryan |
| 2006/0137934 | A1 | 6/2006 | Kurth |
| 2006/0269090 | A1 | 11/2006 | Sapiejewski |
| 2007/0201717 | A1 | 8/2007 | Dyer et al. |
| 2008/0013767 | A1 | 1/2008 | Olsen et al. |
| 2009/0041260 | A1 | 2/2009 | Jorgensen et al. |
| 2009/0196444 | A1 | 8/2009 | Solum |
| 2011/0280425 | A1 | 11/2011 | Gibbons |
| 2012/0106774 | A1 | 5/2012 | Saiki |
| 2012/0201406 | A1 | 8/2012 | Yamaguchi |
| 2013/0148830 | A1 | 6/2013 | Sakaguchi et al. |
| 2014/0348372 | A1 | 11/2014 | Seo et al. |
| 2015/0264467 | A1 | 9/2015 | Annunziato et al. |
| 2017/0223443 | A1 | 8/2017 | Silvestri et al. |
| 2018/0096674 | A1 | 4/2018 | Lin et al. |
| 2018/0098146 | A1 | 4/2018 | Lin et al. |
| 2018/0115839 | A1 | 4/2018 | Eichfeld et al. |
| 2018/0359578 | A1 | 12/2018 | Boley |
| 2019/0356991 | A1 | 11/2019 | Farver |
| 2020/0383613 | A1 | 12/2020 | Patnala |
| 2021/0099791 | A1* | 4/2021 | Grinker ................ H04R 1/2826 |
| 2021/0152924 | A1 | 5/2021 | Keady |
| 2021/0409879 | A1* | 12/2021 | Riemer ................ H04R 25/556 |

FOREIGN PATENT DOCUMENTS

| | | | |
|---|---|---|---|
| EP | 3672279 | A1 | 6/2020 |
| TW | 201026099 | A | 7/2010 |

OTHER PUBLICATIONS

International Search Report and Written Opinion dated May 15, 2023 for PCT/US23/012688.

* cited by examiner

EARPIECES

PRIORITY CLAIM

This application claims priority to, and is a continuation-in-part of, U.S. patent application Ser. No. 16/990,358, titled "EARPIECE PORTING," filed on Aug. 11, 2020, the entire contents of which are incorporated by reference.

BACKGROUND

This disclosure relates to earpieces, and, more particularly, to earpieces for hearing aids with improved feedback active noise reduction (ANR) performance.

SUMMARY

All examples and features mentioned below can be combined in any technically possible way.

In one aspect, an earpiece includes an electro-acoustic transducer and a housing that supports the electro-acoustic transducer such that the housing and the electro-acoustic transducer together define a first acoustic volume and a second acoustic volume. The electro-acoustic transducer is arranged such that a first radiating surface of the transducer radiates acoustic energy into the first acoustic volume and a second radiating surface of the transducer radiates acoustic energy into the second acoustic volume. A mesh is disposed along an outlet of the housing and is arranged to inhibit debris from entering the front acoustic volume. A first microphone is supported in the housing. The first microphone includes a microphone port for sensing pressure. A chimney surrounds the microphone port and mechanically couples the first microphone to the mesh.

Implementations may include one of the following features, or any combination thereof.

In some implementations, the earpiece includes a channel that extends through a wall of the chimney and acoustically couples the microphone port to the first acoustic volume (at a location between the microphone and the mesh).

In certain implementations, the channel has an acoustic impedance that is greater than an acoustic impedance of the chimney.

In some cases, the channel has an acoustic impedance that is greater than 2× an acoustic impedance of the chimney (i.e., the acoustic impedance of the acoustic path through the chimney).

In certain cases, the earpiece also includes a front port that is configured to couple a user's ear canal to a space outside the housing so as to relieve pressure in the user's ear canal when the earpiece is worn.

In some examples, a first, inlet end of the front port extends to the mesh.

In certain examples, the first, inlet end of the front port is mechanically secured to the mesh via an adhesive or heat staking.

In some implementations, the earpiece also includes a rear port that couples the second acoustic volume to the space outside the housing, and respective outlet ends of the rear port and the front port combine before exiting the housing via a combined exit volume and an exit port.

In certain implementations, the earpiece also includes a front port that couples the first acoustic volume to a space outside the housing and a rear port that couples the second acoustic volume to the space outside the housing. Respective outlet ends of the rear port and the front port may combine before exiting the housing via a combined exit volume and an exit port.

In some cases, the housing defines a nozzle and the first acoustic volume is acoustically coupled to an acoustic passage in the nozzle such that the electro-acoustic transducer is acoustically coupled to a user's ear canal when the earpiece is worn.

In certain cases, the earpiece also includes a resonant tube that is disposed within the nozzle and defines the acoustic passage. The resonant tube and the first acoustic volume together define a Helmholtz resonator.

In some examples, the earpiece also includes a channel that extends through a wall of the chimney and acoustically couples the first microphone port to the first acoustic volume. The channel acoustically couples the first microphone port to the first acoustic volume via the acoustic passage of the nozzle.

In certain examples, the earpiece may also include an ear tip supported on the nozzle and configured to form a tight acoustic seal with a user's ear canal when the earpiece is worn.

In some implementations, the housing includes a receptacle for receiving wiring for powering the electro-acoustic transducer.

In certain implementations, the housing includes a receptacle for receiving wiring for powering the first microphone.

In some cases, the earpiece is included as part of a hearing aid. The hearing aid may also include a casing that is configured to sit behind a user's pinna when worn and wiring that couples the casing to the earpiece.

In certain cases, the electro-acoustic transducer is a moving coil transducer.

In some examples, the earpiece also includes a second microphone that is supported by the housing. The first microphone may be a feedback microphone for sensing pressure in a user's ear canal and providing a first microphone signal for feedback noise reduction, and the second microphone may be a feedforward microphone for sensing pressure external to a user's ear canal and providing a second microphone signal for feedforward noise reduction.

In certain examples, the chimney is mechanically secured to the first microphone so as to form an acoustic seal therebetween.

In some implementations, the chimney is mechanically secured to the first microphone via adhesive.

In certain implementations, the chimney is mechanically secured to the mesh via adhesive or heat staking.

In some cases, the first microphone is mounted on a first surface of a printed wiring board such that the microphone port is aligned substantially concentrically with a hole that extends through the printed wiring board, and the chimney surrounds the hole in the printed wiring board and is mechanically coupled to an opposite, second surface of the printed wiring board, such that the chimney is mechanically coupled to the first microphone via the printed wiring board.

Commonly labeled components in the FIGURES are considered to be substantially equivalent components for the purposes of illustration, and redundant discussion of those components is omitted for clarity. Numerical ranges and values described according to various implementations are merely examples of such ranges and values and are not intended to be limiting of those implementations.

DETAILED DESCRIPTION

For hearing aids with active noise reduction (ANR) it can be desirable to maximize the total amount of noise cancellation the device can achieve for the user's own voice (hereinafter "own voice"). By cancelling out own voice, the boominess that is typically associated with plugged ears can be removed. This cancellation can also help to reduce the effect of own voice "combing" that occurs with hearing aid devices due to the delay of the hearing aid amplified path (on the order of milliseconds (ms)). The maximum amount of cancellation that can be achieved with such a device is limited by the device's ability to accurately measure pressure in the user's ear canal.

Hearing aids often include an acoustically resistive mesh (a/k/a wax guard) located in or near a nozzle of the hearing aid. The mesh is desirable for keeping out dust and debris but increases the acoustic impedance between the interior of the hearing aid and the user's ear drum, leading to a corresponding drop in pressure. For systems with a feedback microphone for active noise control, the mesh interferes with the microphone's ability to accurately sense the pressure in the user's ear canal. This pressure drop across the mesh thus limits the maximum noise cancellation performance of the device.

This disclosure is based, at least in part, on the realization that by arranging the feedback microphone to couple directly to the nozzle mesh, this issue can be effectively mitigated. This increases the maximum amount of noise cancellation for the device, without significantly diminishing the amount of debris/wax protection. It also enables the earbud designer to now change the acoustic design behind the nozzle mesh without impacting the maximum amount of noise cancellation possible.

Figure 1:
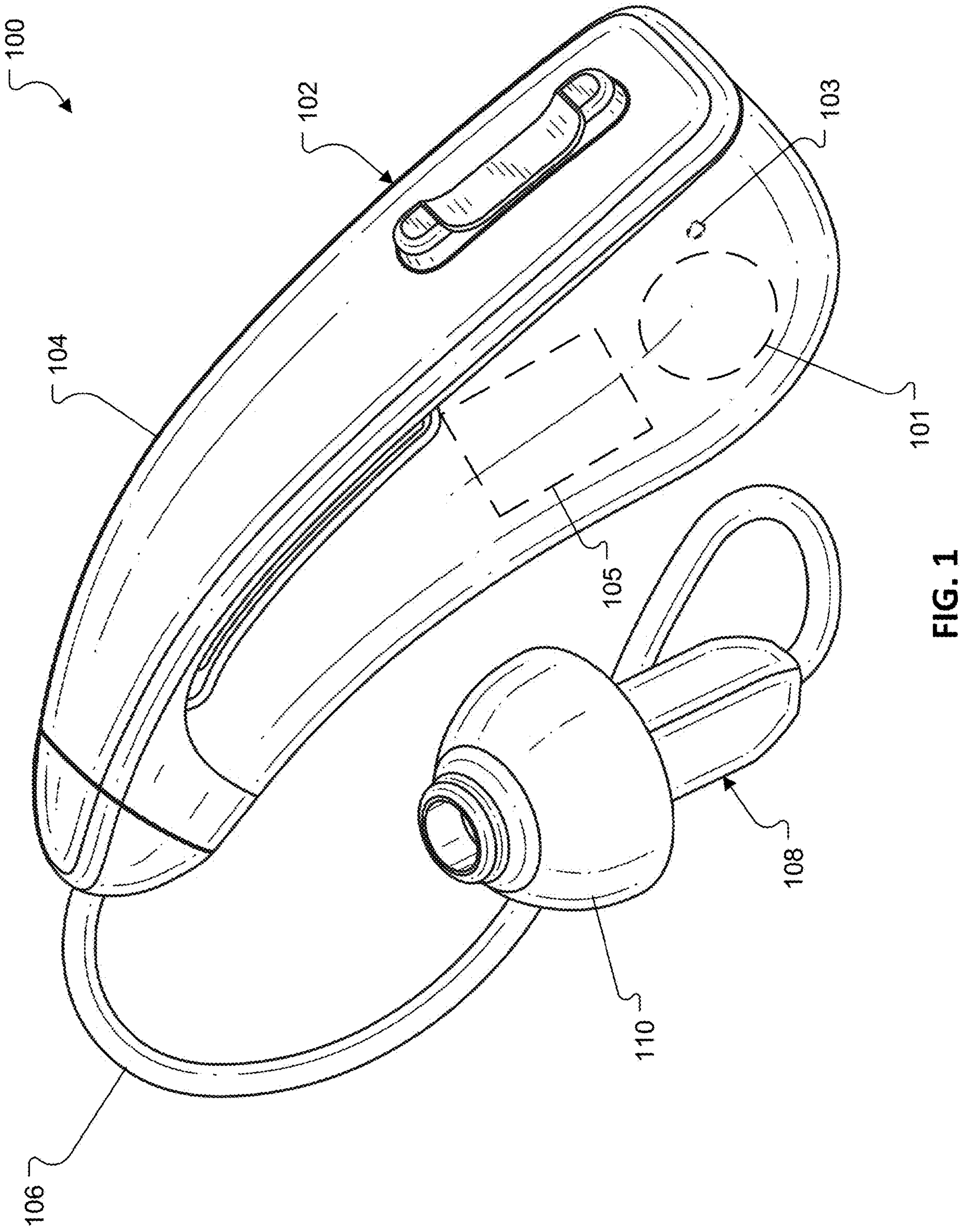
FIG. 1 is a perspective view of a hearing aid.

FIG. 1, illustrates a receiver-in-canal (RIC) hearing aid 100 in accordance with the present disclosure. The hearing aid 100 includes a behind-the-ear portion 102 that includes a battery 101, a microphone 103, and a sound processor 105 housed in a casing 104 designed to sit behind a user's ear (pinna). This behind-the-ear portion 102 of the hearing aid 100 has a small wire 106 designed to run around the user's ear and into an earpiece 108 that is designed to sit in the user's ear canal. The earpiece 108 carries a speaker, also known as the "receiver" or "driver." The hearing aid 100 also includes a compliant tip 110 on the earpiece for engaging the user's ear canal, which help to keep the earpiece in place within the user's ear canal.

Figure 2:
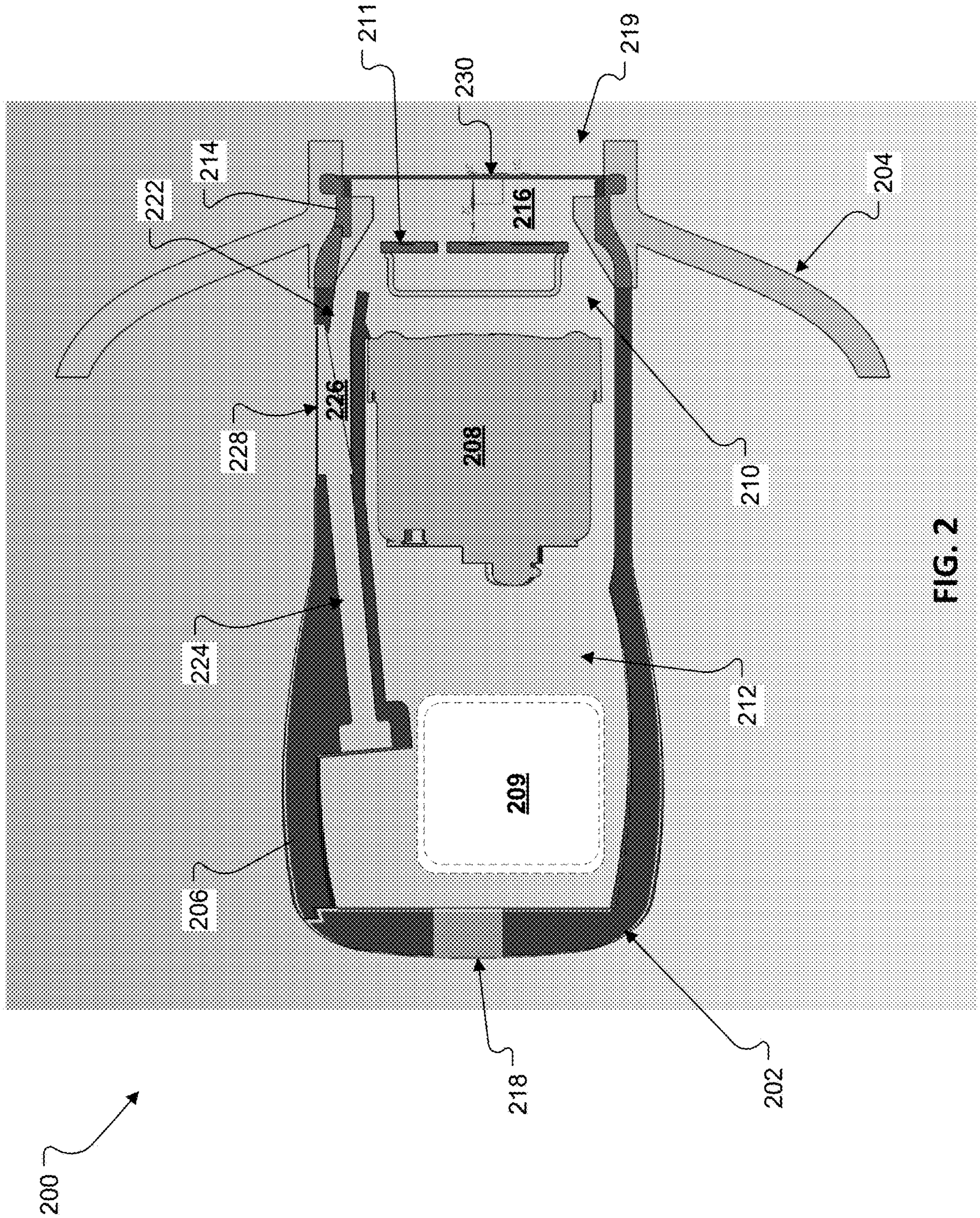
FIG. 2 is a cross-sectional side view of an earpiece from the hearing aid of FIG. 1.

FIG. 2 illustrates an exemplary earpiece 200 for a RIC style hearing aid. The earpiece 200 includes an earbud 202 and an ear tip 204. The earbud 202 includes a housing 206 that supports an electro-acoustic transducer 208 (a/k/a speaker or driver). Together, the housing 206 and the electro-acoustic transducer 208 define a first (front) acoustic volume 210 and a second (rear) acoustic volume 212. The electro-acoustic transducer 208 is arranged such that a first (front) radiating surface of the transducer 208 radiates acoustic energy into the front acoustic volume 210, and such that a second (rear) radiating surface of the transducer 208 radiates acoustic energy into the rear acoustic volume 212. The front acoustic volume 210 has a volume of 17 mm^3 to 23 mm^3, e.g., 20 mm^3, and the rear acoustic volume 212 has a volume of 90 mm^3 to 124 mm^3, e.g., 107 mm^3.

The housing 206 also defines a nozzle 214 that is configured to be coupled to the ear tip 204. The front acoustic volume 210 is acoustically coupled to an acoustic passage 216 in the nozzle 214, e.g., such that the electro-acoustic transducer 208 can be acoustically coupled to a user's ear canal when the earpiece 200 is worn. The housing 206 also defines a receptacle 218 for receiving wiring for powering the electro-acoustic transducer 208. The electro-acoustic transducer 208 can be any known type of electro-acoustic transducer including, for example, a moving coil driver or a balanced armature driver. The electro-acoustic transducer 208 may be a full range microdriver, e.g., having a diaphragm less than 6 mm in diameter, e.g., between 3 mm and 5.5 mm in diameter, e.g., 4.1 mm to 5.4 mm in diameter, such as those described in U.S. Pat. No. 9,942,662, titled "Electro-acoustic driver having compliant diaphragm with stiffening element," and issued on Apr. 10, 2018, and/or U.S. Pat. No. 10,609,489, titled "Fabricating an integrated loudspeaker piston and suspension," issued on Mar. 31, 2020, the complete disclosures of which are incorporated herein by reference. As used herein "full range" is intended to mean capable of producing frequencies from about 20 Hz to about 20 kHz.

The housing 206 may support one or more additional microphones such as a feedforward microphone 209, to be used as part of a feedforward noise cancellation system, and/or a feedback microphone 211 to be used as part of a feedback noise cancellation system. The output from microphone(s) 209 and/or 211 can be input to a feedback and/or feedforward noise cancellation algorithm executed on the sound processor housed in the casing 104 (FIG. 1).

The ear tip 204 is supported on the nozzle 214 such that an acoustic passage 219 defined by the ear tip 204 is acoustically coupled to the acoustic passage 216 in the nozzle 214. The housing 206 also defines a front port 222 (a/k/a "Peq port") that acoustically couples the front acoustic volume 210 to the area external to the housing 206. The port may consist of an open hole, a screen covered hole, or any other configuration that results in a desired acoustic behavior. The earpiece 200 also includes a rear port 224 (a/k/a "mass port") that couples the rear acoustic volume 212 to the space outside the housing 206. The rear port 224 primarily serves to reduce the effective stiffness of the rear volume on the driver and prevent overpressure due to environmental changes, while the front port 222 prevents excess low frequency pressures in the ear canal and reduces occlusion.

In some examples, the front port 222 may be implemented in the form of a tube. The front port tube may be formed integrally with the housing 206. Alternatively, or additionally, the front port tube may be made of metal, e.g., stainless steel. The front port tube may include a metal tube seated inside a wall of the front acoustic volume 210. The housing 206 may be made of plastic, and the front port tube may be heat-staked to the plastic. The tube may be substantially straight, curved, or serpentine along its length. It may be formed by molding an indented path into a body of the housing 206 and covering that path with another piece (e.g., 3 out of 4 sides of a rectangular cross section may be molded into a body of the housing 206, and that path may be covered with a plate to form the 4$^{th}$ side). As used herein "diameter" is intended to cover a diameter of a circle for a circular cross-section as well as an equivalent diameter for a non-circular cross-section, e.g., square, rectangular, or substantially semi-circular cross-sections. Alternatively, the front port may be in the form of a hole, e.g., an open hole or a mesh covered hole.

In some cases, the rear port 224 may be implemented in the form of a tube. The tube may be formed integrally with the housing 206. Alternatively, or additionally, the tube may be made of metal, e.g., stainless steel. The tube may include a metal tube seated inside a wall of the rear acoustic volume 212. The housing 206 may be made of plastic, and the tube may be heat-staked to the plastic. Alternatively, the rear port may be implemented in the form of a hole, e.g., an open hole or a screen covered hole. The tube may be substantially straight, curved, or serpentine along its length. It may be formed by molding an indented path into the housing 206 and covering that path with another piece (e.g., 3 out of 4 sides of a rectangular cross section may be molded into a body of the housing 206, and that path may be covered with a plate to form the 4$^{th}$ side). As used herein "diameter" is intended to cover a diameter of a circle for a circular cross-section as well as an equivalent diameter for a non-circular cross-section, e.g., square, rectangular, or substantially semi-circular cross-sections.

Notably, an inlet end of the front port 222 is internal to the earpiece 200 such that the only way to block it external to the earpiece 200 is to block the nozzle 214 of the earpiece 200. This can be desirable, since blocking the nozzle 214 may prevent any artificially high product-generated sound pressures from entering the ear. Also note that respective outlet ends of the rear port 224 and the front port 222 combine before exiting the product via a combined exit volume 226 and an exit port 228. This means that neither can be plugged from the outside of the housing 206 without plugging the other. In a plugged condition, the exit port impedance will increase, which will acoustically short circuit the front and rear acoustic volumes 210, 212, reducing the pressure at the ear relative to that which would have occurred by plugging only the front port 222. This can be designed to also result in reduced maximum pressures. In some implementations, the maximum pressure in the front acoustic volume 210 when the exit port 228 is sealed (blocked) is between 100 dB SPL and 120 dB SPL. In some cases, the maximum pressure in the front acoustic volume 210 when the exit port 228 is sealed is no greater than 132 dB SPL.

The front port 222 has a length of 2.083 mm to 2.818 mm (e.g., 2.450 m), a cross-sectional area of 0.575 mm^2 to 0.779 mm^2 (e.g., 0.677 mm^2), and a total volume of 1.198 mm^3 to 2.193 mm^3 (e.g., 1.659 mm^3). The rear port 224 has a length of 3.791 mm to 5.129 mm (e.g., 4.460 mm), a cross-sectional area of 0.208 mm^2 to 0.282 mm^2 (e.g., 0.245 mm^2), and a total volume of 0.789 mm^3 to 1.445 mm^3 (e.g., 1.093 mm^3). Each of the front port 222 and the rear port 224 may include an acoustic impedance element, such as an acoustic mesh, for controlling the impedance of the port. In the illustrated example, the outlet end of the front port 222 includes a front port mesh 223 and the inlet end of the rear port 224 includes a rear port mesh 225. The front port mesh 223 has a specific acoustic impedance of 5 Rayl to 7 Rayl (e.g., 6, Rayl). Suitable acoustic meshes for the front and rear ports are available from Sefar Inc., Buffalo, NY The exit port 228 may take various forms such as a mesh (e.g., metal screen) covered hole, an open hole, a tube, or a plurality of holes, e.g., a plurality of mesh covered or open holes. In the example illustrated in FIG. 2, the exit port 228 is in the form of a mesh covered hole. The hole of the exit port 228 has an open area of about 4.005 mm^2 to about 5.419 mm^2 (e.g., 4.712 mm^2), and a diameter or equivalent diameter of about 2.08 mm to about 2.82 mm (e.g., 2.45 mm). The exit port mesh 229 has a specific acoustic impedance of 5 Rayl to 6 Rayl (e.g., 7 Rayl). The acoustic impedance of the exit port 228 is much lower than that of the front port 222 and the rear port 224. For example, the acoustic impedance of the front port 222 (including the front port mesh 223) is greater than 2×, e.g., at least 10×(20 dB), the acoustic impedance of the exit port 228 (including the exit port mesh 229). The acoustic impedance of the rear port 224 (including the rear port mesh 225) is greater than 2×, e.g., at least 10×(20 dB), the acoustic impedance of the exit port 228 (including the exit port mesh 229). Suitable acoustic meshes for the exit port 228 are available from Sefar Inc., Buffalo, NY.

The exit volume 226 has a volume of 1.275 mm^3 to 1.725 mm^3 (e.g., 1.500 mm^3). The volume of the exit volume 226 is much smaller than the front acoustic volume 210 and the rear acoustic volume 212. For example, the volume of the front acoustic volume 210 is at least 8×, e.g., 13×, the volume of the exit volume 226. The volume of the rear acoustic volume 212 is at least 53×, e.g., 71×, the volume of the exit volume 226. The exit volume size and exit port impedance may be tuned to provide a desired performance under open and sealed conditions.

Notably, the opening at the end of the acoustic passage 216 in the nozzle 214 and the exit port 228 are the only acoustic openings through the exterior of the housing 206 and are designed to the be the only two acoustic paths that acoustically couple the front and rear acoustic volumes to the area outside the housing 206. It is also worth noting that the front port 222, the rear port 224, and the exit port 228 and exit volume 226 are all free of (i.e., do not include) any dynamic means for controlling impedance, such as an acoustic actuator. The earpiece 200 does not include any means for dynamically controlling impedance. In that regard, the earpiece 200 does not include any acoustic actuators, e.g., acoustic valves, with the exception of the electro-acoustic transducer 208.

The feedback microphone 211 is arranged to sense pressure in the user's ear canal. The more accurately the feedback microphone 211 is able to sense the pressure in the user's ear canal, the better the feedback ANR is achievable. However, the feedback microphone's ability to sense that pressure accurately is inhibited by a nozzle mesh 230 that is arranged along an outlet end of the acoustic passage 216 in the nozzle 214. The nozzle mesh 230 inhibits (e.g., prevents) dirt and debris from entering the housing 206 and thereby helps to protect the components housed therein but the nozzle mesh 230 also introduces an acoustic impedance, e.g., on the order of about 6 Rayl to about 30 Rayl, between the user's ear canal and the feedback microphone 211. That together with the relatively large volume of the acoustic passage 216 and the front acoustic volume 210, which provide a relatively high acoustic compliance, can result in a pressure drop across the nozzle mesh 230.

Figure 3:
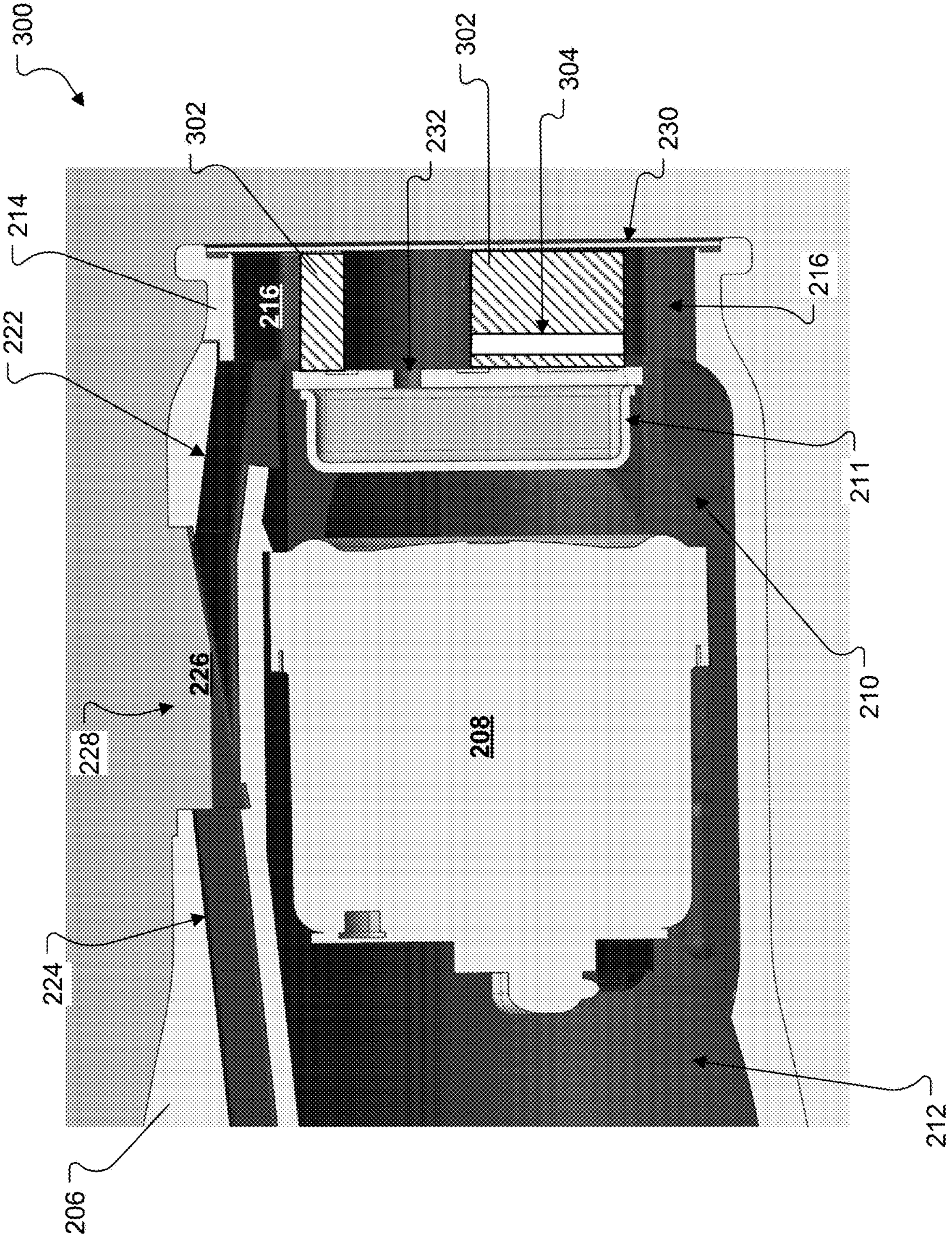
FIG. 3 is a partial cross-sectional side view of an alternative implementation of an earbud for use with the hearing aid of FIG. 1.

To address that issue, the earbud 300 illustrated in FIG. 3 introduces a chimney 302 that surrounds the microphone port 232 on the feedback microphone 211 and mechanically and acoustically couples the feedback microphone 211 to the nozzle mesh 230. The chimney 302 effectively creates a small volume around the microphone port 232. Due to the small volume, there is little acoustic compliance. This enables the pressure in the small volume within the chimney 302 to more closely match that within the user's ear canal despite the acoustic impedance of the nozzle mesh 230, and, consequently, the measurement taken via microphone port 232 more accurately reflects the pressure within the user's ear canal, which enables better feedback ANR performance.

The chimney 302 also helps alleviate another issue. The length in the nozzle 214 can cause the acoustic transfer function between the electro-acoustic transducer 208 and the feedback microphone 211 to be higher than the acoustic transfer function between the electro-acoustic transducer 208 and the ear drum in some frequency bands, which can lead to overdrive of the feedback microphone 211 and adversely affect ANR performance. But when the microphone port 232 effectively comes out to the ear canal, as it does with the introduction of the chimney 302, that problem is mitigated. With the chimney 302, the acoustic transfer function between the electro-acoustic transducer 208 and the ear drum should be very close to acoustic transfer function between the electro-acoustic transducer 208 and the feedback microphone 211.

The chimney 302 is in the form of a wall, e.g., a cylindrical wall, that surrounds the microphone port 232. The chimney 302 is mechanically coupled at one end to the feedback microphone 211, e.g., via adhesive, so as to form an acoustic seal therebetween. In some cases, the microphone 211 may be mounted on a first surface of a printed wiring board (e.g., a flexible printed wiring board 234, FIG. 5), such that the microphone port 232 is aligned substantially concentrically with a hole that extends through the printed wiring board, and the chimney 302 may surround the hole in the printed wiring board and may be mechanically coupled, e.g., via adhesive or solder, to the opposite, second surface of the printed wiring board, such that the chimney 302 is mechanically coupled to the feedback microphone 211 via the printed wiring board. At the opposite end, the chimney 302 is mechanically coupled to the nozzle mesh 230, e.g., via adhesive or heat staking.

In some instances, it is possible for ear wax to accumulate on and occlude the nozzle mesh 230 only or predominantly in the region at the end of the chimney 302, thereby effectively blocking the feedback microphone 211 and preventing any pressure from showing up there, but not significantly blocking the rest of the nozzle mesh 230. In such circumstances, the feedback loop will be expecting a large transfer function from the feedback microphone 211 to the electro-acoustic transducer 208, but it will actually have zero. In that scenario, the feedback loop is practically not running.

Normally, the hearing aid equalization is designed to account for other aspects of the hearing aid signal processing, including feedback ANR. If the chimney 302 is blocked and the coupling between the feedback microphone 211 to the electro-acoustic transducer 208 is severely reduced, the feedback system will not operate as intended and the hearing aid equalization may not provide the intended frequency response or gain in the hearing aid, which is undesirable.

To address this, a channel 304 may be provided through the chimney 302 that acts as a leak path between the microphone port 232 and the acoustic passage 216 in the nozzle 214 so that if the end of the chimney 302 device does get sealed by debris accumulating on the nozzle mesh 230, there is still a path and the feedback microphone 211 is still able to pickup what the electro-acoustic transducer 208 is playing. Thus, even if the chimney 302 is completely blocked, this arrangement turns into something similar to a more traditional feedback loop where the feedback microphone 211 is just sampling a pressure that is inside of the front volume 210 via the acoustic passage 216.

The channel 304 does a couple of things: 1.) if the end of the chimney 302 is blocked, the transfer function between the feedback microphone 211 and the electro-acoustic transducer 208 will not go to zero, it will still be around the same level it would have been with the port open; and 2.) the channel 304 is also high enough impedance so that, under normal operating condition, it does not significantly negatively impact the benefit that is provided by the chimney 302. In that regard, the channel 304 has an impedance on the order of 20 dB relative to the impedance on the nozzle mesh 230. Both the nozzle mesh impedance and the channel impedance need to be significantly smaller impedance that the impedance of air inside the chimney 302. In some cases, the channel 304 has a cross-sectional area of 0.034 mm^2 to 0.046 mm^2 (e.g., 0.040), and a length of 0.96 mm to 1.30 mm (e.g., 1.13 mm).

Figure 4:
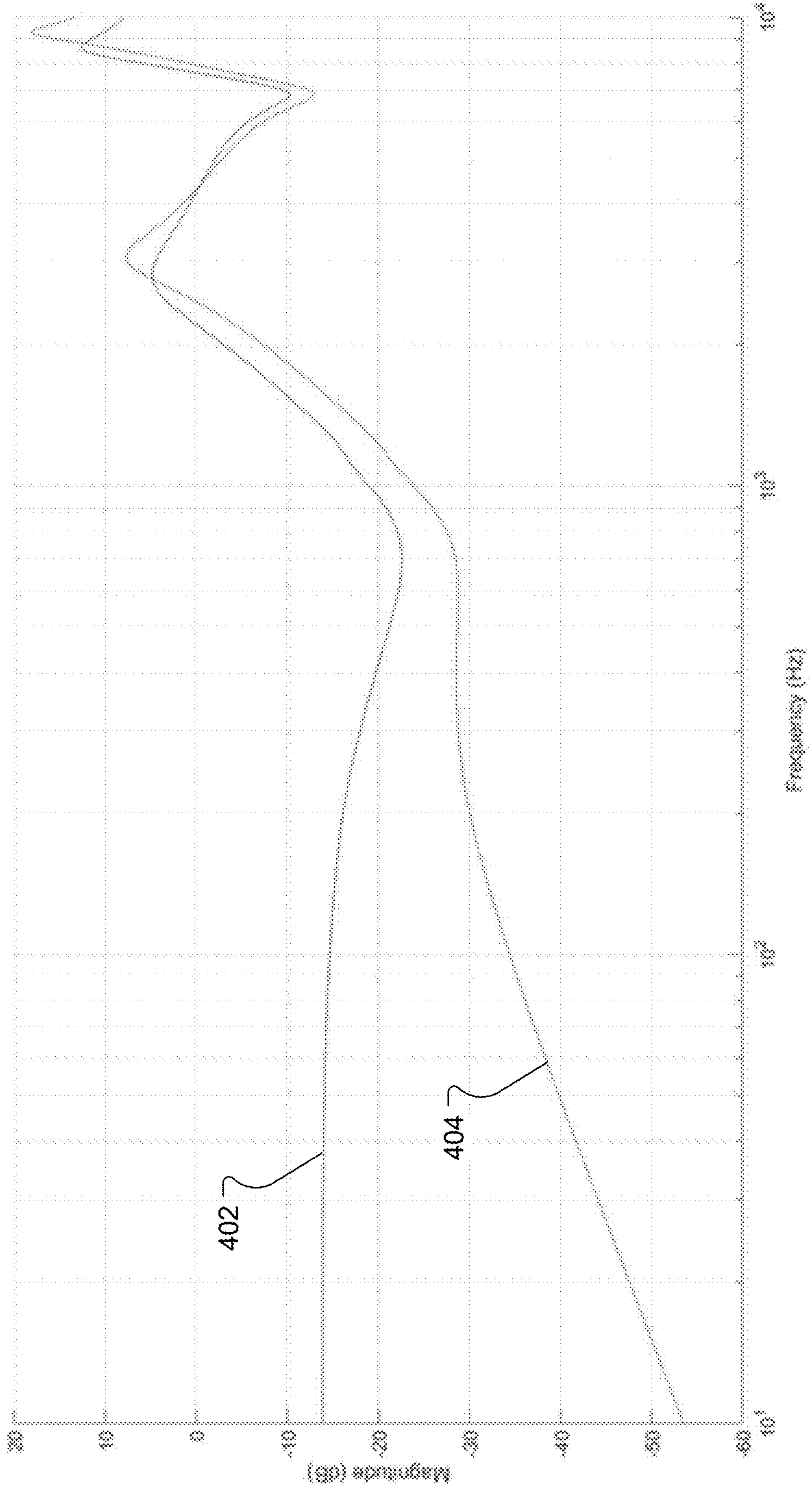
FIG. 4 is a plot showing the theoretical maximum feedback active noise reduction as a function of frequency for the implementations illustrated in FIGS. 2 and 3.

FIG. 4 illustrates the theoretical maximum feedback ANR as a function of frequency for the implementations illustrated in FIGS. 2 and 3. These plots are based on lumped element models of those implementations. This is plotting the theoretical limits of ANR performance assuming the application of infinite feedback controller gain.

Plot 402 represents the theoretical maximum ANR performance for the implementation without the chimney; i.e., the implementation of FIG. 2, and plot 404 represents the theoretical maximum ANR performance for the implementation that includes the chimney; i.e., the implementation illustrated in FIG. 3. As can be seen by comparison of plots 402 and 404, the introduction of the chimney provides a significant improvement in theoretical max performance, particularly in the 10 Hz to 1 kHz range—note an improvement of about 20 dB at 100 Hz.

Figure 5:
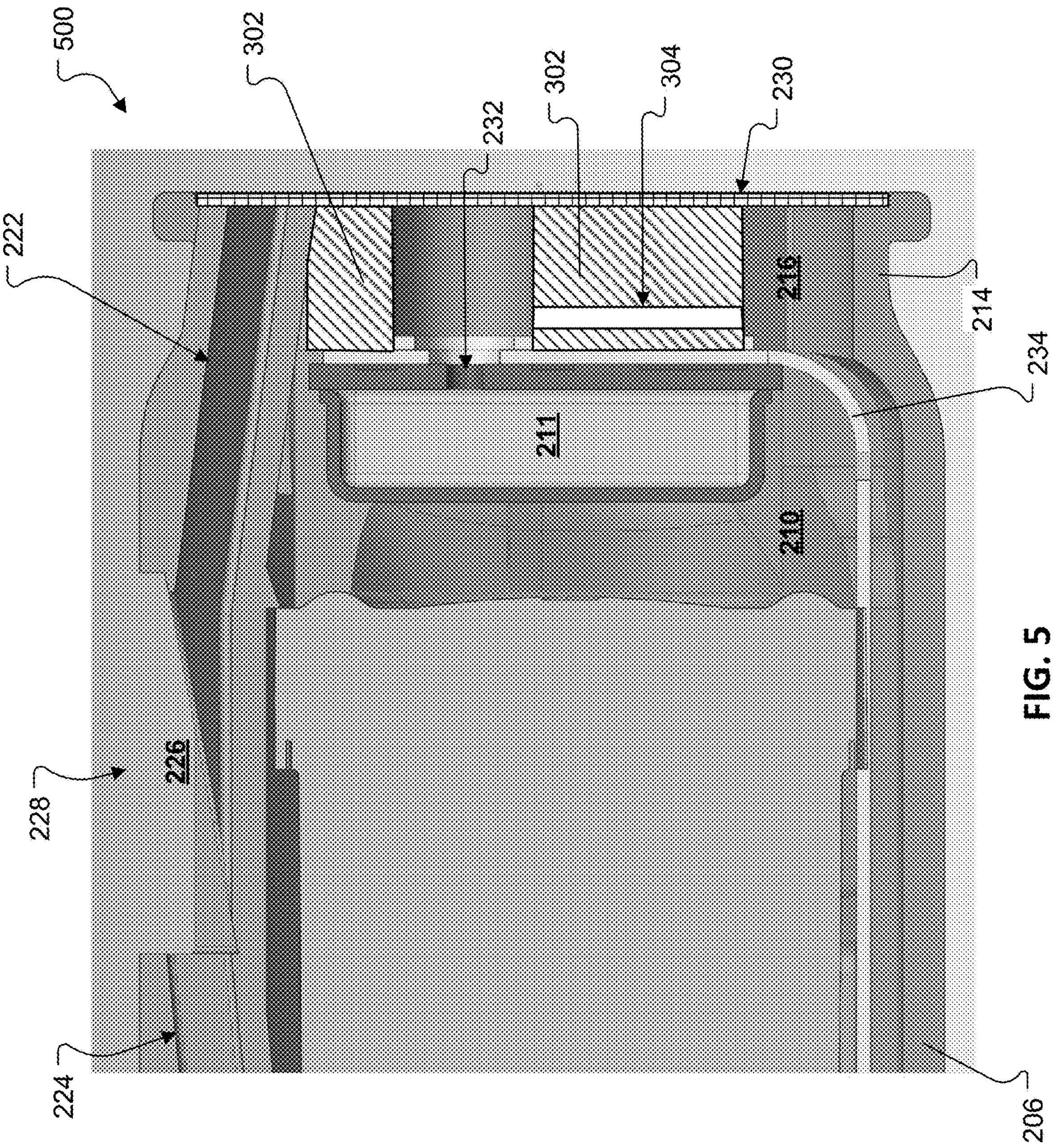
FIG. 5 is a partial cross-sectional side view of another alternative implementation of an earbud for use with the hearing aid of FIG. 1.

FIG. 5 illustrates another implementation of an earbud 500 in which, in addition to the chimney 302, the Peq port (a/k/a front port 222) is extended to the nozzle mesh 230. The inlet end of the front port 222 may be mechanically coupled to the nozzle mesh 230, e.g., via an adhesive or heat staking. As mentioned above the front port 222 is provided to alleviate excess low frequency pressures in the ear canal and reduce occlusion. That is, when the user is speaking, or when the user's foot strikes the ground, associated vibrations travel through the user's body and into their ear canals, which creates pressure in the ear canals that can be uncomfortable. The goal of the front port 222 is to relieve that pressure. Connecting the front port 222 to the nozzle mesh 230 directly shorts the nozzle 214 to the inlet end of the front port 222, and, consequently, the only impedance the canal pressure has to overcome is that of the front port 222, and nothing else. This may be beneficial where the impedance of the acoustic passage 216 is high. The chimney 302 in conjunction with the direct coupling of the front port 222 to the nozzle mesh 230 improves the overall voice ANR capability by bringing the voice gradient closer to the driver gradient.

Nominally, internal pressure needs to pass through the impedance of the nozzle (which has a mesh), and the front port 222 (PEQ) (which also has a mesh). (Z_nozzlemesh+Z_PEQ). By bringing the front port 222 to the plane of the nozzle, we can use the mesh in the plane of the nozzle as a mesh for the front port 222, reducing the total impedance seen by an internal pressure source (just Z_PEQ).

Figure 6:
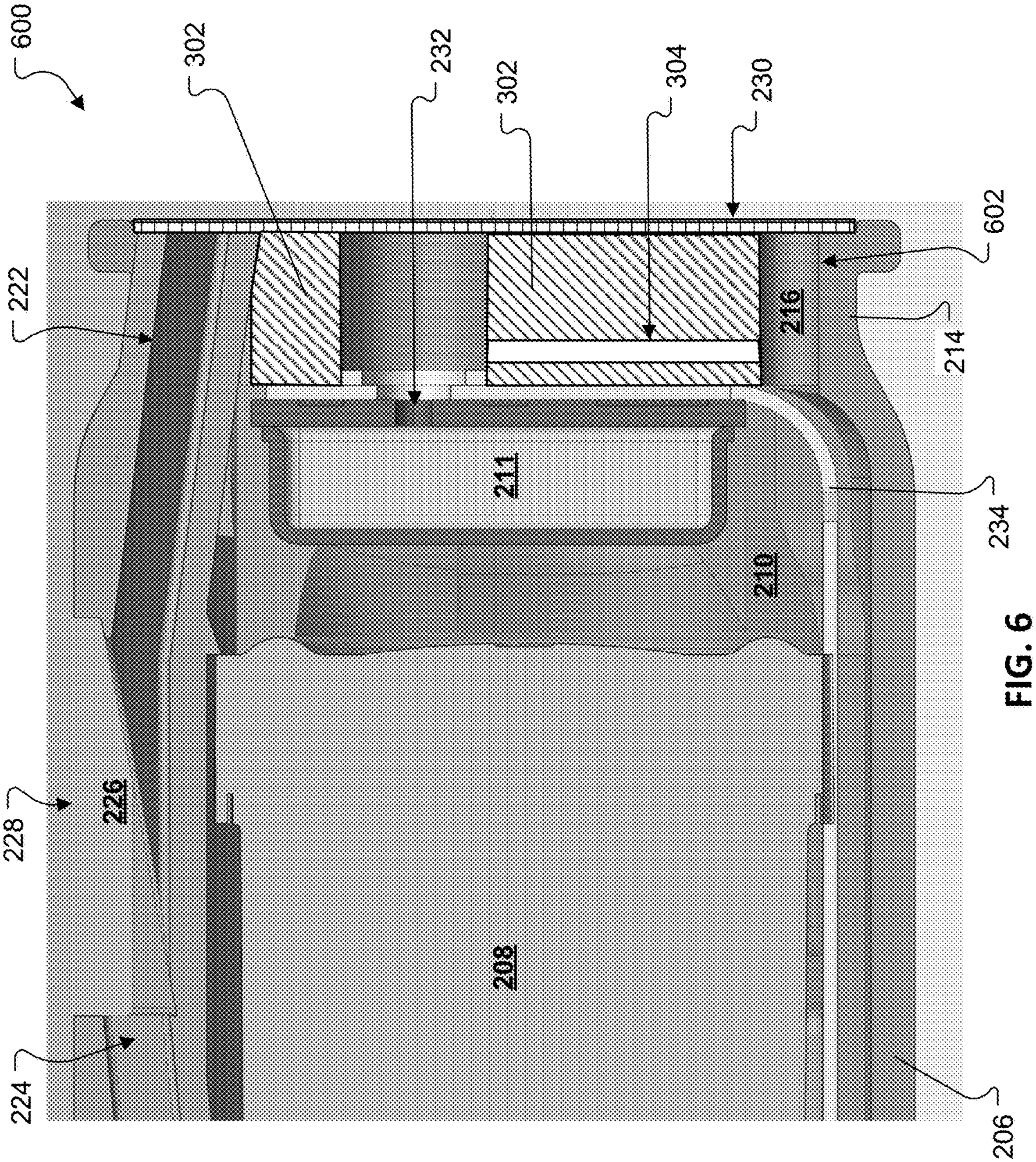
FIG. 6 is a partial cross-sectional side view of a third alternative implementation of an earbud for use with the hearing aid of FIG. 1.

This issue is further exacerbated if the effective cross-sectional area of the acoustic passage 216 is further constrained such as by the presence of a resonant tube 602 as shown in the earbud 600 of FIG. 6. The use of a moving coil transducer may be desirable because they offer improved ANR performance and wider operating bandwidth than traditional balanced armature drivers. However, small moving coil electro-acoustic transducers can be inefficient. In the hearing aid 100 (FIG. 1), energy in the speech band is going to be amplified, and, if the electro-acoustic transducer 208 is not efficient in that range, it will draw a lot of power. The consequence of that is, only so much voltage can be supplied to the transducer 208 so the signal might be limited or clipped and that can negatively affect intelligibility. In addition, if, due to the inefficiency, the transducer 208 consumes a lot of power to achieve the desired output, then runtime will also be negatively affected; i.e., for hearing aids, this can severely limit the battery life of a product.

To address this issue, a resonance in the key voice band area (somewhere around 2.5-6 kHz, for instance) can be used to effectively boost the system's sensitivity in that key frequency region. This would have the net effect of increasing the sensitivity of the system and its overall efficiency. In the implementation of FIG. 6, this resonance is provided by essentially creating a Helmholtz resonator off the front of the transducer 208. In that regard, the front acoustic volume 210 provides the compliance and the acoustic mass is provided by a slug of air in the resonant tube 602. In order to achieve the resonance in the desired frequency range, the open area of the resonant tube 602 may be quite small.

Thus, in order to relieve pressure inside of the user's ear canal, it would need to pass through the resonant tube 602 and then out of the front port 222, if the front port 222 did not extend to the mesh. What that means is that the pressure would pass through a high impedance resonant tube before it would be released to the outside world, and, as a result, the amount of pressure the user would observe from an internal source in their ear canal would increase if the front port 222 was not extended to the mesh 230. Connecting the front port 222 to the nozzle mesh 230 directly shorts the nozzle 214 to the inlet end of the front port 222, and, consequently, the only impedance the canal pressure has to overcome is that of the front port 222, and nothing else; i.e., this configuration avoids the need to overcome the impedance of the resonant tube 602. In the example illustrated in FIG. 6, the channel 304 acoustically couples the microphone port 232 to the resonant tube 602.

Figure 7:
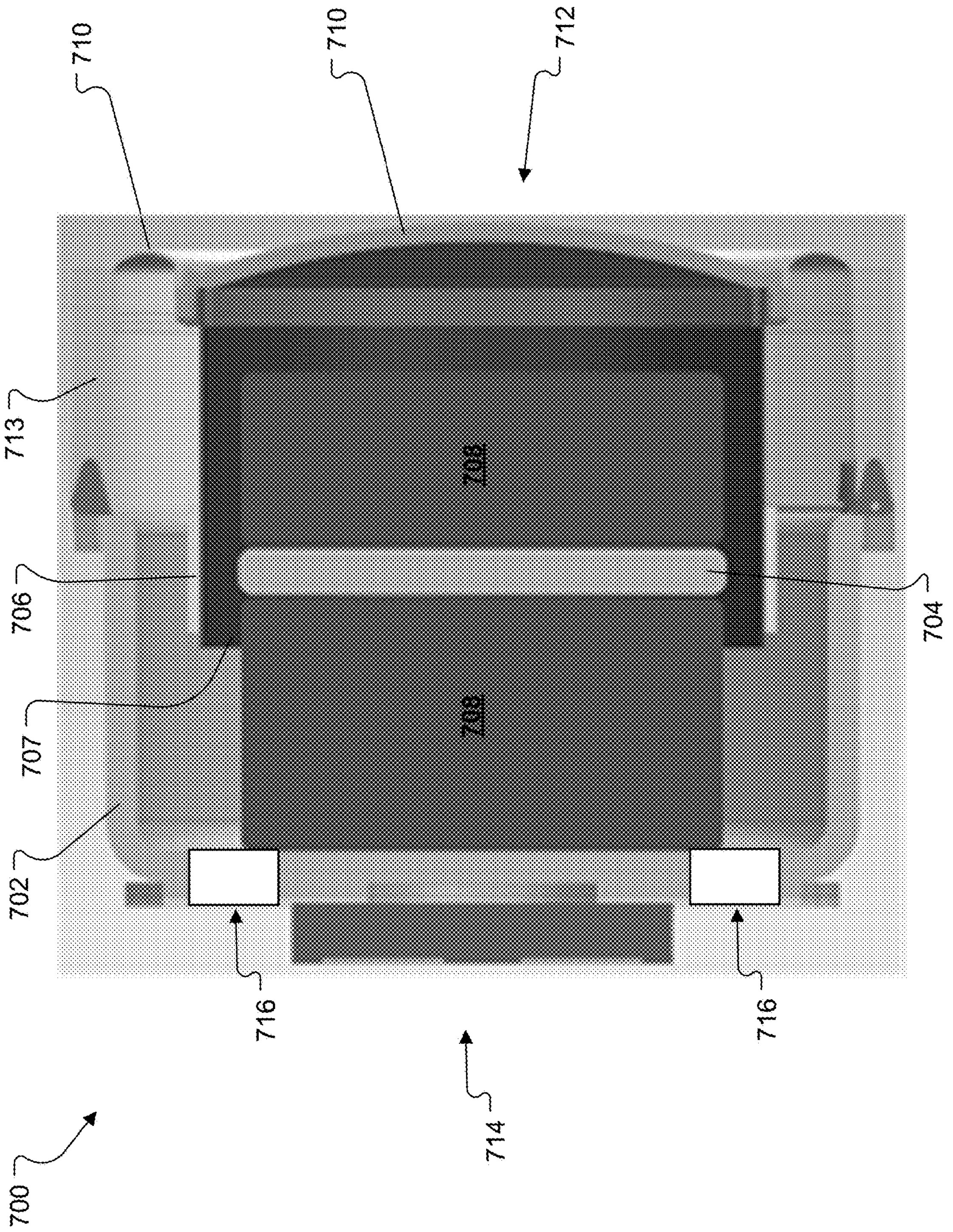
FIG. 7 is a cross-sectional side view of a moving coil transducer.

As mentioned above, it may be beneficial to use a moving coil transducer, particularly for applications in which broadband active noise reduction is desired. An exemplary moving coil transducer 700 is illustrated in FIG. 7. As shown, the electro-acoustic transducer 700 includes a driver housing 702, one or more plates 704, a coil 706 wound about a bobbin 707, and one or more magnets 708 that responds to electrical signals from the behind-the-ear portion 102 to displace a diaphragm 710, suspended from the housing 702 via a surround 711, to generate audible acoustic energy. In the illustrated example, the surround 711 is coupled to the housing 702 via a frame 713. Additionally, as shown, the transducer 700 has a front side 712 and a rear side 714. While front side 712 includes diaphragm 710, rear side 714 includes one or more acoustic driver ports 716. The driver ports 716 allow acoustic energy radiated from a rear surface of the diaphragm 710 to pass into the rear acoustic volume of the housing, while acoustic energy radiated from an opposing (and exposed), front surface of the diaphragm 710 can radiate directly into the front acoustic volume.

Although implementations have been described in which an ear tip is provided to help secure the housing 306 in user's ear, in other implementations, the earpiece may include a housing that is designed to fit within a user's ear canal without an ear tip. In some examples, the housing may be molded to match a shape of the user's ear canal.

While various examples of an earpiece for a behind-the-ear hearing aid have been described, the foregoing features and benefits are applicable to other earpieces, such as other types of hearing aids, e.g., in-the-ear (ITE) hearings aids, e.g., Invisible in the canal (IIC) hearings aids, and Completely in the canal (CIC) hearing aids; as well as other types of in-ear devices, e.g., in-ear headsets, in-ear headphones.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

A number of implementations have been described. Nevertheless, it will be understood that additional modifications may be made without departing from the scope of the inventive concepts described herein, and, accordingly, other implementations are within the scope of the following claims.

What is claimed is:

1. An earpiece comprising:

an electro-acoustic transducer;

a housing supporting the electro-acoustic transducer such that the housing and the electro-acoustic transducer together define a first acoustic volume and a second acoustic volume, the electro-acoustic transducer being arranged such that a first radiating surface of the transducer radiates acoustic energy into the first acoustic volume and such that a second radiating surface of the transducer radiates acoustic energy into the second acoustic volume;

a mesh disposed along an outlet of the housing and arranged to inhibit debris from entering the first acoustic volume;

a first microphone supported in the housing, the first microphone comprising a first microphone port for sensing pressure; and a chimney surrounding the first microphone port and mechanically coupling the first microphone to the mesh, wherein the chimney is secured directly to the mesh via adhesive or heat staking.

2. The earpiece of claim 1, further comprising a channel extending through a wall of the chimney and acoustically coupling the first microphone port to the first acoustic volume.

3. The earpiece of claim 2, wherein the channel has an acoustic impedance that is greater than an acoustic impedance of the chimney.

4. The earpiece of claim 2, wherein the channel has an acoustic impedance that is greater than 2× an acoustic impedance of the chimney.

5. The earpiece of claim 1, further comprising:

a front port configured to couple a user's ear canal to a space outside the housing so as to relieve pressure in the user's ear canal when the earpiece is worn.

6. The earpiece of claim 5, wherein a first, inlet end of the front port extends to the mesh.

7. The earpiece of claim 6, wherein the first, inlet end of the front port is mechanically secured to the mesh via an adhesive or heat staking.

8. The earpiece of claim 6, further comprising:

a rear port coupling the second acoustic volume to the space outside the housing, wherein respective outlet ends of the rear port and the front port combine before exiting the housing via a combined exit volume and an exit port.

9. The earpiece of claim 1, further comprising:

a front port coupling the first acoustic volume to a space outside the housing; and a rear port coupling the second acoustic volume to the space outside the housing, wherein respective outlet ends of the rear port and the front port combine before exiting the housing via a combined exit volume and an exit port.

10. The earpiece of claim 1, wherein the housing defines a nozzle, and wherein the first acoustic volume is acoustically coupled to an acoustic passage in the nozzle such that the electro-acoustic transducer is acoustically coupled to a user's ear canal when the earpiece is worn.

11. The earpiece of claim 10, further comprising a resonant tube disposed within the nozzle and defining the acoustic passage, wherein the resonant tube and the first acoustic volume together define a Helmholtz resonator.

12. The earpiece of claim 11, further comprising a channel extending through a wall of the chimney and acoustically coupling the first microphone port to the first acoustic volume, wherein the channel acoustically couples the first microphone port to the first acoustic volume via the acoustic passage of the nozzle.

13. The earpiece of claim 10, further comprising an ear tip supported on the nozzle and configured to form a tight acoustic seal with a user's ear canal when the earpiece is worn.

14. The earpiece of claim 1, wherein the housing includes a receptacle for receiving wiring for powering the electro-acoustic transducer.

15. The earpiece of claim 1, wherein the housing includes a receptacle for receiving wiring for powering the first microphone.

16. A hearing aid comprising the earpiece of claim 1, the hearing aid further comprising:

a casing configured to sit behind a user's pinna when worn; and wiring coupling the casing to the earpiece.

17. The earpiece of claim 1, wherein the electro-acoustic transducer is a moving coil transducer.

18. The earpiece of claim 1, further comprising a second microphone supported by the housing, wherein the first microphone is a feedback microphone for sensing pressure in a user's ear canal and providing a first microphone signal for feedback noise reduction, and wherein the second microphone is a feedforward microphone for sensing pressure external to a user's ear canal and providing a second microphone signal for feedforward noise reduction.

19. The earpiece of claim 1, wherein the chimney is mechanically secured to the first microphone so as to form an acoustic seal therebetween.

20. The earpiece of claim 1, wherein the chimney is mechanically secured to the first microphone via adhesive.

21. The earpiece of claim 1, wherein the first microphone is mounted on a first surface of a printed wiring board such that the first microphone port is aligned substantially concentrically with a hole that extends through the printed wiring board, and wherein the chimney surrounds the hole in the printed wiring board and is mechanically coupled to an opposite, second surface of the printed wiring board, such that the chimney is mechanically coupled to the first microphone via the printed wiring board.

22. The earpiece of claim 1, wherein the housing defines a nozzle configured to be coupled to an eartip, and wherein the mesh is secured directly to the nozzle.

23. The earpiece of claim 22, wherein a first end of chimney is secured directly to the mesh via adhesive or heat staking and wherein the mesh extends between the first end of the chimney and the nozzle.

24. The earpiece of claim 22, wherein the chimney comprises wall that surrounds the first microphone port and defines a first acoustic passage between the first microphone and the mesh, and wherein the wall and the nozzle together define a second acoustic passage that extends between the first acoustic volume and the mesh.

* * * * *